April 16, 1963 M. A. PIZZINO ETAL 3,085,295

METHOD OF MAKING INLAID CIRCUITS

Filed April 30, 1957

INVENTORS:
MICHAEL A PIZZINO
FELIX J. RANDINO
BY George Lipkin
Lee J. Huntzberger
ATTORNEY United States Patent Office 3,085,295
Patented Apr. 16, 1963

3,085,295
METHOD OF MAKING INLAID CIRCUITS
Michael A. Pizzino, Lynbrook, N.Y., and
Felix J. Randino, Weehawken, N.J.
Filed Apr. 30, 1957, Ser. No. 656,156
6 Claims. (Cl. 18—61)
(Granted under Title 35, U.S. Code (1952), sec. 266)

The invention described herein may be manufactured and used by or for the Government of the United States of America for governmental purposes without the payment of any royalties thereon or therefor.

This invention relates to a method of making inlaid circuits. More particularly the invention relates to the lamination of electrically conducting materials of selected electrical resistance upon a non-conducting base or material. Such bodies are presently of importance in so-called electronic "printed" coils, components or circuits. Many methods are presently in use for the production of such bodies, such as those employing vacuum deposition of a conducting film on a non-conducting plate, flush inlaid circuits, photographic processes, chemical deposition of silver, and off-set printing using conducting silver paints. Though these prior methods have successfully "printed" the coils, conducting strips, components or circuits on a non-conducting base material, the adhesion of the conducting film or strip to the base material under various conditions of heat, humidity, thermal shock, salt spray and others has not been as satisfactory as has been desired.

An object of this invention is to provide a method of making an improved body of non-conducting base material carrying on a face thereof a thin conducting film arranged thereon in a desired conducting pattern, with which the film will be strongly adherent to the non-conducting body under severe conditions of use, such as varying conditions of heat, humidity, thermal shock and salt spray, with which the adherent conducting layer may be provided on either one or both faces of the non-conducting body, and which will be relatively simple, practical, durable and inexpensive.

Another object is to provide an improved method of applying thin, electrically conducting films to one or both faces of a body of non-conducting material, which will produce a product that will withstand severe usage conditions, such as of heat, humidity, thermal shock, and corrosive atmospheres, which may be easily stripped from the casting molds, which will be relatively simple, convenient, practical and inexpensive, and which will require only simple and inexpensive apparatus.

Other objects and advantages will be apparent from the following description of some embodiments or examples of the invention, and the novel features will be particularly pointed out hereinafter in connection with the appended claims.

Figure 1:
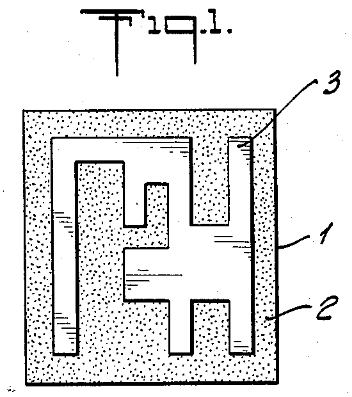
FIG. 1 is a face elevation of a mold plate having attached thereto the conducting film according to a selected pattern.
Figure 4:
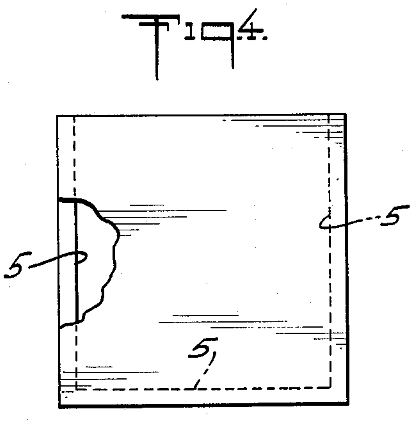
FIG. 4 is a face elevation of the assembled plates ready for the casting, but with the clamping means removed.
Figure 2:
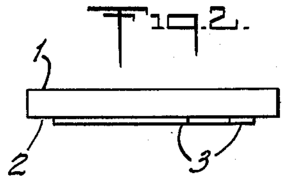
FIG. 2 is a top plan of the same.
Figure 6:
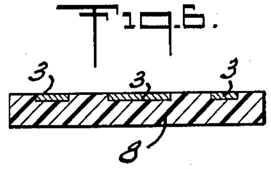
FIG. 6 is a transverse sectional elevation of the completed casting, with the conducting film embedded in a face thereof and corresponding to the article made by a casting in the apparatus of FIG. 3.

In the embodiment of the invention illustrated in FIGS. 1, 4, and 6, a suitable mold plate 1, which may be of metal, glass or any other suitable material which will withstand the curing temperatures, is provided on one face thereof with a continuous coating 2 of a suitable release agent that is dried on the mold plate. Upon this dried coated face a paint 3 is spread or applied as a layer in accordance with a desired circuit pattern. This paint is one which has electrically conducting properties and usually contains powdered metal. Such paint, after drying, will remain temporarily adherent to the coated face of plate 1, and the thickness of the paint layer will depend upon the desired thickness of the conducting film. A non-conducting, casting or embedding resin is then cast against the coated face of the plate 1 and against the paint pattern thereon.

In the illustrated example this is done by assembling a second mold plate 4, in face to face relation to the paint carrying face of the plate 1, but spaced from plate 1 by a U-shaped spacing gasket 5, coated with a release agent, and which extends along the sides and bottom of plates 1 and 4, but not across the top of these plates. Suitable means is provided for confining the plates 1 and 4 in this face to face, but spaced apart relation, one such means being C clamps 6, the arms of which abut against the outer faces of plates 1 and 4, and the usual adjustable screw 7 of which, when turned, presses the plates towards each other in a manner well known in the use of such C clamps. The inside face of the plate 4, which is the surface forming one wall of the casting cavity, is also provided with a coating of a suitable release agent.

The embedding or casting resin is then introduced into the space between the plates through the opening in the top, it usually being introduced in a liquid or flowable condition, and after the resin has been introduced into and fills the space between the plates, the mold, with the resin therein, is subjected to a curing treatment for the resin, usually by the use of heat. After the resin has been cured, the C clamps are removed, and the plates 1 and 4 then separated. The casting of resin, which is formed between the plates, is then stripped from the plates 1 and 4, which produces the article shown in transverse section in FIG. 6, and which corresponds in outline to the shape of the cavity between plates 1 and 4. Because the plates 1 and 4 have both been precoated with a release agent, the electrically conducting film pattern or layer on plate 1 will strip readily from both plates 1 and 4 and will remain embedded in the face of the casting 8.

Figure 3:
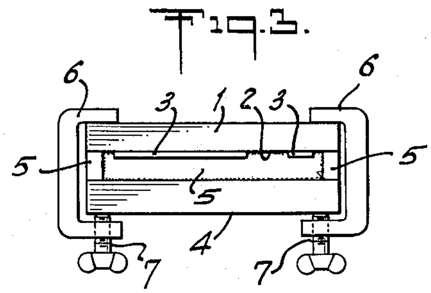
FIG. 3 is a top plan of the mold plate illustrated in FIG. 1, with a second mold plate and a spacer gasket associated therewith to form a casting mold.
Figure 7:
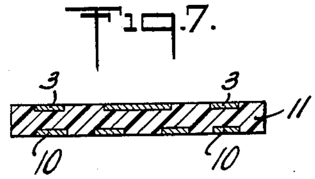
FIG. 7 is a sectional elevation similar to FIG. 6, but illustrating a section through the completed article performed by casting with the apparatus of FIG. 5.
Figure 5:
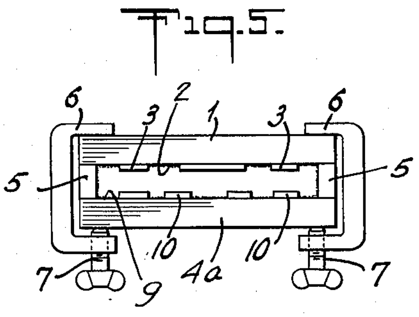
FIG. 5 is a top plan similar to FIG. 3, but illustrating a modification in which the conducting pattern is provided on both mold plates for transfer to both faces of the resin base.

In some instances it may be desired to have a conducting film pattern on both faces of the resin casting or body, and the manner of producing such a product is illustrated in FIGS. 5 and 7. In FIG. 5 the base plate 1 is prepared with a release coating on a face thereof, and over that is applied a layer of electrically conducting paint 3 in the desired pattern, the same as explained in connection with FIGS. 1 to 4. The plate *4a*, which corresponds to plate 4 of FIG. 3, is first provided on its inner face with a coating 9 of a release agent and the agent dried, and then a layer 10 of electrically conducting paint is provided or deposited in a suitable manner and in a desired pattern upon the face of the plate *4a* which has been precoated with the release agent. The layer 10 of paint on the plate *4a* can be and usually is of a different pattern than that of layer 3 on the plate 1. The plates 1 and *4a* are then confined together, with a U-shaped spacing gasket 5 coated with a release agent interposed between them, by C clamps 6 as explained in connection with FIGS. 1 to 4. Then the resin is cast in the space between the assembled plates 1 and 4*a*. After the resin has been cast it is cured, and then the plates 1 and 4*a* are separated, during which the casting 11 of resin and paint layers 3 and 10 will strip easily as a unit from the faces of plates 1 and 4*a*, due to the presence of the release coatings on those faces, and the paint layers 3 and 10 will adhere to the resin casting 11 and remain embedded therein as explained in connection with FIG. 6.

The plates 1, 4 and 4*a* are preferably made of a highly polished material which will withstand the resin curing temperatures, and steel molds are particularly useful for this purpose. Release agents are well known, but silicone pan glaze is particularly useful for the release agent. Other silicone and wax release agents are also useful. One useful release agent is identified as Dow Corning XR–671 resin, which may be baked on a steel mold into a hard, smooth film. After the release agent dries, the desired design or pattern of conducting paint is applied to the precoated, polished faces of the mold members, in any suitable manner, such as by printing, brushing or spraying a metallic paint thereon to the desired thickness, a silver conducting paint being particularly useful for this purpose. An example of such a silver paint is identified as Du Pont 4817 and was sprayed to a thickness of 1.0 mil. When applying the conducting coating by spraying, the mold plates are masked where the conducting coating is not desired. The U-shaped spacing gasket 5 is also precoated with a release agent, and it may advantageously be a silastic coated aluminum strip formed into a large U-shape, with a thickness between faces of the U corresponding to the desired thickness of the resin casting. The mold assembly is clamped together with sufficient pressure to prevent leakage of the liquid casting resin. The resin is preferably poured into the mold cavity through the top thereof.

Specimens made in this manner when exposed to extreme conditions of humidity, heat, salt spray and thermal shock, showed no effect on the adhesion to the cast resin or the silver or other conducting paint layer or film. Good soldered connections to the silver film were made.

While any resinous casting or embedding compounds may be used, the epoxy or polyester type resins have excellent adhesion to metals and metal coatings, but poor adhesion to such materials as silicone coatings and waxes. The film of metal paint has poor adhesion to surfaces coated with silicone and other wax films.

As a specific example, a quantity of the embedding or casting resin marketed by Acme Wire Company of New Haven, Connecticut, and identified as Acme Star-No. 2008, was mixed with a hardener, a filler, and an activator at room temperature, in the proportions by weight of 10 parts resin base, 3 parts filler, 5 parts hardener, and 1 part activator. This mixture was degassed in a vacuum at 10 mm. of mercury (absolute pressure) for 1½ hours. The cast resin was cured for 3 hours at 82° C. (180° F.), then removed from the mold and post cured for 3 hours at 110° C. (230° F.) The resin mixture became extremely viscous during the degassing period. In order to sufficiently soften the resinous material for pouring purposes, to introduce it into the mold for casting purposes, the material was heated to the curing temperature of 82° C. (180° F.) for approximately 10 minutes. The casting was removable from the mold most easily when the mold temperature was at, or raised to, the post cure temperature of 110° C. (230° F.) and allowed to remain at that temperature for about 15 minutes. Such castings were rigid, hard, opaque and black in color.

It will be understood that various changes in the details, materials, steps and arrangements of parts, which have been herein described and illustrated in order to explain the nature of the invention, may be made by those skilled in the art within the principle and scope of the invention as expressed in the appended claims.

We claim:

1. The method of producing an embedded printed circuit with improved adhesion of the electrically conducting strip to the non-conducting base material that will withstand severe usage conditions such as heat, humidity, thermal shock, salt spray and corrosive atmosphere, which comprises coating a casting face of a mold member with a release agent, applying to such coated face an electrically conducting layer in a desired circuit pattern, confining a second mold member in face to face alignment with said coated and layered face, with the inner face of said second member coated with a release agent, with a spacing gasket confined between and spacing apart the margins of the adjacent faces of said members, but with a gap in the gasket along one edge of the assembled members, casting between said faces a non-conducting embedding resin introduced through said gap, causing curing of said resin in situ in said space between said members, and then separating said members and stripping said resin casting from the coated mold faces with the layered pattern adhering to and embedded flush in the resin casting.

2. The method as set forth in claim 1, and applying a layered and electrically conducting pattern on that face of the second mold member which was pre-coated with a release agent before said casting, whereby said casting of non-conducting material will carry conducting patterns on both faces thereof.

3. The method of producing an embedded printed circuit with improved adhesion of the electrically conducting strip to the non-conducting base material that will withstand severe usage conditions such as heat, humidity, thermal shock, salt spray and corrosive atmosphere, which comprises coating a casting face of a mold member with a release agent, applying to such coated face an electrically conducting silver layer in a desired circuit pattern, confining a second mold member in face to face alignment with said coated and layered face, with the inner face of said second member coated with a release agent and with a spacing gasket confined between and spacing apart the adjacent faces of said members, but with a gap in the gasket along one edge of the assembled members, casting between said faces a non-conducting embedding resin introduced through said gap, causing curing of said resin in situ in said space between said members, and then separating said members and stripping said resin casting from the coated mold faces with the silver layered pattern adhering to and embedded flush in the resin casting.

4. The method of producing an embedded printed circuit with improved adhesion of the electrically conducting strip to the non-conducting base material that will withstand severe usage conditions such as heat, humidity, thermal shock, salt spray and corrosive atmosphere, which comprises coating a casting face of a mold member with a silicone pan glaze release agent, applying to such coated face an electrically conducting layer in a desired circuit pattern, confining a second mold member in face to face alignment with said coated and layered face, with the inner face of said second member coated with a release agent, with a spacing gasket confined between and spacing apart the adjacent faces of said members, but with a gap in the gasket along one edge of the assembled members, casting between said faces a non-conducting embedding resin introduced through said gap, causing curing of said resin in situ in said space between said members, and then separating said members and stripping said resin casting from the coated mold faces with the layered pattern adhering to the resin casting.

5. The method of producing an embedded printed circuit with improved adhesion of the electrically conducting strip to the non-conducting base material that will withstand severe usage conditions such as heat, humidity, thermal shock, salt spray and corrosive atmosphere, which comprises coating a casting face of a mold member with a silicone pan glaze release agent, applying to such coated face an electrically conducting silver layer in a desired circuit pattern, confining a second mold member in face to face alignment with said coated and layered face, with the inner face of said second member coated with a reelase agent, with a spacing gasket confined between and spacing apart the adjacent faces of said members, but with a gap in the gasket along one edge of the assembled members, casting between said faces, a non-conducting embedding resin introduced through said gap, causing curing of said resin in situ in said space between said members, and then separating said members and stripping said resin casting from the coated mold faces with the layered pattern adhering to and embedded flush in the resin casting.

6. The method as set forth in claim 1, and said release coating being of the silicone type, the layer being a paint containing silver as a conducting medium and the casting resin being of the epoxy type.

References Cited in the file of this patent

UNITED STATES PATENTS

| | | |
|---|---|---|
| 1,963,834 | Decker | June 19, 1934 |
| 2,061,106 | Schellenger | Nov. 17, 1936 |
| 2,273,700 | Feuerstein | Feb. 17, 1942 |
| 2,431,393 | Franklin | Nov. 25, 1947 |
| 2,444,997 | Lovesey | July 13, 1948 |
| 2,447,541 | Sabee et al. | Aug. 24, 1948 |
| 2,482,094 | Chavannes | Sept. 20, 1949 |
| 2,486,148 | Glynn et al. | Oct. 25, 1949 |
| 2,636,073 | Clarke | Apr. 21, 1953 |
| 2,639,213 | Barth | May 19, 1953 |
| 2,724,674 | Pritikin | Nov. 22, 1955 |